United States Patent [19]

Sawada et al.

[11] Patent Number: 5,739,438
[45] Date of Patent: Apr. 14, 1998

[54] METHOD FOR CONTROLLING A TENSION OF A METAL STRIP IN A HEAT TREATMENT FURNACE

[75] Inventors: Hiroshi Sawada; Kohji Omori; Hiroshi Yoshimura; Takumi Imajuku, all of Tokyo, Japan

[73] Assignee: NKK Corporation, Tokyo, Japan

[21] Appl. No.: 667,640

[22] Filed: Jun. 21, 1996

[30] Foreign Application Priority Data

Jun. 23, 1995 [JP] Japan ................. 7-157700

[51] Int. Cl.$^6$ .................................. G01L 1/26
[52] U.S. Cl. ................... 73/862.391; 148/128
[58] Field of Search ............ 73/862.391; 148/128, 148/500, 503, 508, 511, 645, 657, 156

[56] References Cited

U.S. PATENT DOCUMENTS

| | | | |
|---|---|---|---|
| 4,571,274 | 2/1986 | Yanagishima et al. | 148/156 |
| 4,773,949 | 9/1988 | Yamaguchi et al. | 148/128 |
| 4,878,961 | 11/1989 | Yamaguchi et al. | 148/128 |
| 5,497,817 | 3/1996 | Ikegami | 148/657 |

FOREIGN PATENT DOCUMENTS

| | | |
|---|---|---|
| 56-62927 | 5/1981 | Japan . |
| 62-37697 | 8/1987 | Japan . |

Primary Examiner—Elizabeth L. Dougherty
Attorney, Agent, or Firm—Frishauf, Holtz, Goodman, Langer & Chick

[57] ABSTRACT

A method for controlling a tension of a metal strip in a heat treatment furnace, comprising (a) travelling the metal strip through a plurality of tapered rolls; (b) measuring a tension ($\sigma$) working on the metal strip through at least one of the tapered rolls; (c) computing a critical tension ($\sigma_{cr}$) which generates heat buckle based on a thickness of the metal strip, a width of the metal strip, an elastic modulus of the metal strip, a length of a flat roll portion and a roll taper under a hot state; and (d) controlling the tension measured by the step (b) to be over a tension ($\sigma_{min}$) sufficient to prevent transverse displacement but less than the critical tension ($\sigma_{cr}$) which generates heat buckle. The critical tension ($\sigma_{cr}$) which generates heat buckle is calculated by the equation: $\sigma_{cr}=K \cdot t^A \cdot (W-FL)^B \cdot \theta_h^C \cdot E$, where t is the thickness of the metal strip (mm), W is the width of the metal strip (mm), FL is the length of a flat roll portion, $\theta_h$ is the roll taper (rad) under a hot state, E is the elastic modulus of the metal strip (kgf/mm$_2$), and K, A, B, C are constants. The tension ($\sigma_{min}$) sufficient to prevent transverse displacement is obtained as a minimum value of the tension ($\sigma$) satisfying the following equations: $\Delta D<(l-W))/2$ and $\Delta D=g(t, W, \mu, LS, E, \theta_h, \sigma, Ra, Ra')$, where $\Delta D$ is the transverse displacement amount, l is the roll barrel length, $\mu$ is the coefficient of friction between the metal strip and roll, LS is the line speed, $\sigma$ is the tension of the metal strip, Ra is the surface roughness of the metal strip, and Ra' is the surface roughness of a roll.

3 Claims, 7 Drawing Sheets

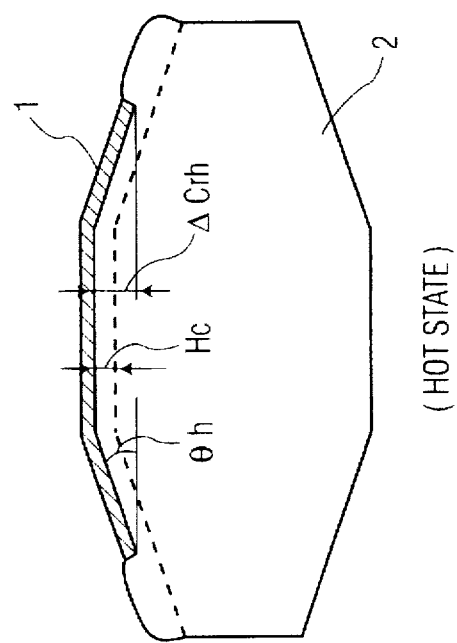
FIG. 5B (HOT STATE)
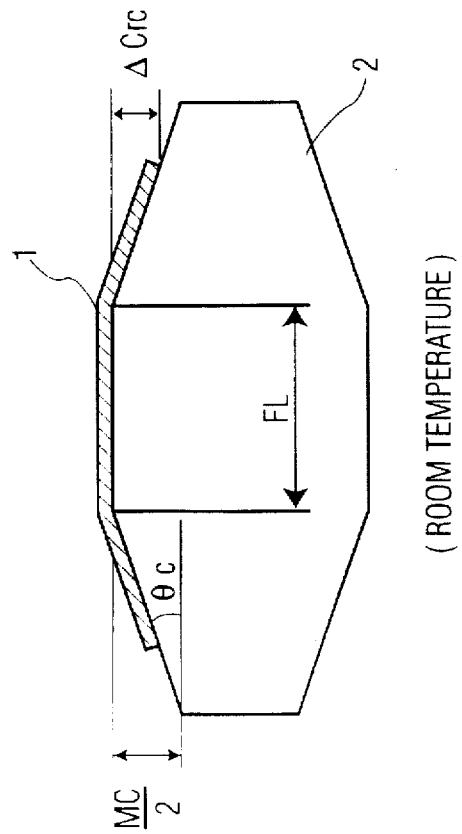
FIG. 5A (ROOM TEMPERATURE)

METHOD FOR CONTROLLING A TENSION OF A METAL STRIP IN A HEAT TREATMENT FURNACE

BACKGROUND OF THE INVENTION

1. Field of the Invention

The present invention relates to a method for controlling a tension of a metal strip in a heat treatment furnace.

2. Description of the Related Arts

When a metal strip is conventionally threaded in a continuous annealing furnace under certain conditions of temperature and tension, heat buckle occurs in the case that (1) the metal strip is thin and of wide dimensions, (2) the annealing is performed at a high temperature, (3) the metal strip is threaded under a high tension, and (4) the roll shape in the furnace is inadequate. The heat buckle causes reduction of production capacity and of yield owing to the troubles on the threading of the metal strip.

In the prior art, transverse displacement (lateral deflection) occurs depending on the shape of the metal strip, the balance of a metal temperature and a furnace temperature, the tension, and the threading speed. If the transverse displacement increases, then the metal strip collides against the furnace wall to damage the edge of the strip and, in a worst case, to fracture the metal strip.

To cope with this disadvantage, Japanese unexamined patent publication No. 56-62927 discloses a technology to locate one or more complex shape rolls each having a different profile at the shell portion, which rolls are arranged along the travelling direction of the metal strip. The disclosure gives an example in which a vertical continuous annealing furnace contains both intra-furnace rolls of MC=2 mm and FL=600 mm for a narrow width strip threading and those of MC=4 mm and FL=900 mm for a wide width strip threading. Thus the furnace treats the strip without generating transverse displacement even under a significant change in strip width. The term "MC" is a roll mechanical crown ([diameter of flat roll portion]−[diameter of roll edge portion]), and the term "FL" is the length of flat roll portion.

Japanese examined patent publication No. 62-37697 discloses a technology which can thread an extremely low carbon steel sheet (IF steel) in a vertical continuous annealing furnace without generating heat buckle by applying the condition of [(MC of a top tapered roll )<(MC of a bottom tapered roll )]. The disclosure gives an example in which the normal tapered rolls have a taper index R (=(MC/2)/Lt× 1000), while the top tapered roll has R≦1.2 and the bottom tapered roll has R≧1.2. The term (Lt) is a length of taper portion on a tapered roll.

These prior art references have, however, the following problems.

According to the technology disclosed in Japanese unexamined patent publication No. 56-62927, the rolls for a narrow width strip and the rolls for a wide width strip are located at both the top and bottom of the furnace, and the combination of the roll arrangement prevents transverse displacement even when the strip size (width of steel sheet) is changed. The rolls for the narrow strip have, however, a short length at the flat roll portion. Accordingly, if the width of the metal strip increases, a heat buckle is generated at the top rolls where the tension to the metal strip increases. In that case, one or more rolls for the narrow width strip always exist at the upper zone of the vertical continuous annealing furnace, so that the transverse displacement may be suppressed on threading a thin and wide strip but the heat buckle cannot be prevented.

The technology disclosed in Japanese examined patent publication No. 62-37697 defines the roll taper index to decrease the taper or the crown on the top tapered rolls against the bottom tapered rolls.

These prior art references fail to show the optimum tension response to the roll shape, and have disadvantages in that they can either prevent the transverse displacement but fail to prevent the heat buckle, or prevent the heat buckle but fail to prevent the transverse displacement.

SUMMARY OF THE INVENTION

It is an object of the present invention to provide a method for controlling a tension of a metal strip in a heat treatment furnace so as to prevent troubles such as traverse displacement and heat buckle during threading of the metal strip and so as to obtain stable control of the tension.

To attain the object, the present invention provides a method for controlling a tension of a metal strip in a heat treatment furnace having a plurality of tapered rolls comprising the steps of:

(a) travelling the metal strip through the plurality of tapered rolls;

(b) measuring a tension ($\sigma$) working on the metal strip through at least one of the tapered rolls;

(c) computing a critical tension ($\sigma_{cr}$) which generates heat buckle, based on a thickness of the metal strip, a width of the metal strip, an elastic modulus of the metal strip, a length of a flat roll portion and a roll taper under a hot state; and (d) controlling the tension measured by the step (b) to be over the tension ($\sigma_{min}$) sufficient to prevent transverse displacement but less than the critical tension ($\sigma_{cr}$) which generates heat buckle.

Further, the critical tension ($\sigma_{cr}$) of the step (c) can be calculated by an equation:

$$\sigma_{cr} = K \cdot t^A \cdot (W-FL)^B \theta_h^C \cdot E$$

where t: thickness of the metal strip (mm)
W: width of the metal strip (mm)
FL: length of a flat roll portion
$\theta_h$: roll taper (rad) under the hot state
E: elastic modulus of the metal strip (kgf/mm$^2$)
K, A, B, C: constant Still furthermore, the tension ($\sigma_{min}$) sufficient to prevent transverse displacement of the step (c) can be obtained as a minimum value of the tension ($\sigma$) satisfying the following equations:

$$\Delta D < (l-W)/2$$

$$\Delta D = g(t, W, \mu, LS, E, \theta_h, \sigma, Ra, Ra')$$

where $\Delta D$: transverse displacement amount
l: roll barrel length
W: width of the metal strip(mm)
t: thickness of the metal strip(mm)
$\mu$: coefficient of friction between the metal strip and roll
LS: line speed
E: Young's modulus of the metal strip
$\theta_h$: roll taper under the hot state
$\sigma$: tension of the metal strip
Ra: surface roughness of the metal strip
Ra': surface roughness of roll

BRIEF DESCRIPTION OF THE DRAWINGS

FIG. 5(A) is a schematic drawing of a tapered roll at room temperature.

FIG. 5(B) is a schematic drawing of a tapered roll at hot state.

DESCRIPTION OF THE EMBODIMENT

Generation of heat buckle is a problem when a thin and wide metal strip is travelled through rolls at the top and the bottom of a vertical continuous heat treatment furnace and is heat-treated in the vertical continuous heat treatment furnace. It is necessary to clarify conditions of the critical tension of the heat buckle generation. The inventors conducted a numerical computation based on the following equation and found that the larger a total crown is, the easier the generation of the heat buckle is.

$$\Delta Crh = \Delta Crc + Hc$$

where $\Delta Crh$ is a roll crown at a hot state, $\Delta Crc$ is a total crown at room temperature, and $Hc$ a heat crown.

FIG. 5(A) and FIG. 5(B) each show a schematic drawing of a tapered roll at room temperature and a schematic drawing of a tapered roll at hot state, respectively. The referential numeral 1 denotes a metal strip, and 2 a tapered roll. MC is a mechanical crown of the roll, FL is a length of flat roll portion, $\theta_h$ a roll taper at hot state and $\theta_c$ a roll taper at room temperature.

Figure 6:
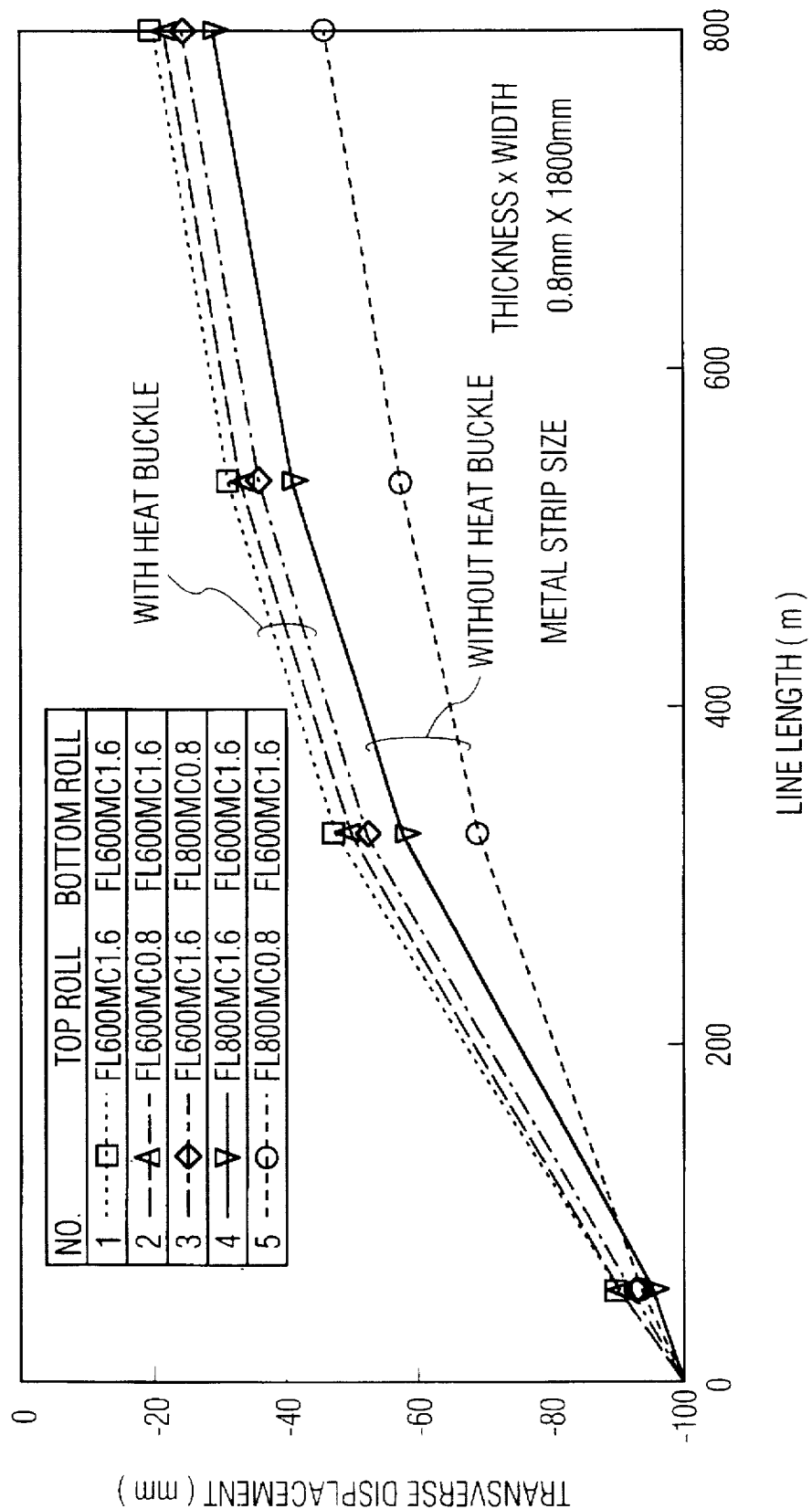
FIG. 6 is a graph showing a relation between a line length and an amount of transverse displacement when a roll shape is used as a parameter according to the present invention.

FIG. 6 shows a simulation results of the corrective performance of transverse displacement dependent on difference of shapes of tapered crown rolls. The figure indicates that the change in the correction of initially produced transverse displacement is made with the line length. FIG. 6 shows that Nos. 1 through 3 which are the rolls with shorter flat portion give more prompt and higher corrective performance against the transverse displacement, while the heat buckle is generated instead. In addition, as shown in FIG. 6, a larger mechanical crown gives a higher corrective performance against the transverse displacement.

The above-described condition, however, cannot be used alone to estimate the limit of the heat buckle occurrence. Accordingly, the inventors defined $\sigma_{cr}$ of the tension to generate the heat buckle as the critical tension of the metal strip beyond which the heat buckle appears. Thus, a conditional equation (1) relating to the critical tension which generates the heat buckle was derived. The equation contains the variables of thickness of the metal strip, width of the metal strip, modulus of elasticity of the metal strip, taper for the total crown, and length of the flat roll portion.

$$\sigma_{cr} = K \cdot t^A \cdot (W - FL)^B \theta_h^C \cdot E \qquad (1)$$

where t: thickness of the metal strip (mm)
W: width of the metal strip (mm)
FL: length of the flat roll portion
$\theta_h$: roll taper (rad) at a hot state
E: elastic modulus of the metal strip (kgf/mm$^2$)
K, A, B, C: constant.

The constants A, B, and C are determined from a regression equation on the basis of experiment.

When the tension at a top tapered roll is defined as $\sigma_t$, and the tension at a bottom tapered roll is defined as $\sigma_b$, the relation of $\sigma_b < \sigma_t$ is always established. That is, the actual tension induced to the metal strip in the continuous heat treatment furnace differs on the top and bottom tapered rolls owing to the self weight. Thus the top tapered roll gives higher tension than the bottom tapered roll. Therefore, for the tension within a single furnace, it is preferable in view of the prevention of the heat buckle occurrence to select a longer flat roll portion of the top tapered roll since the longer flat roll portion is difficult to generate the heat buckle.

Figure 1:
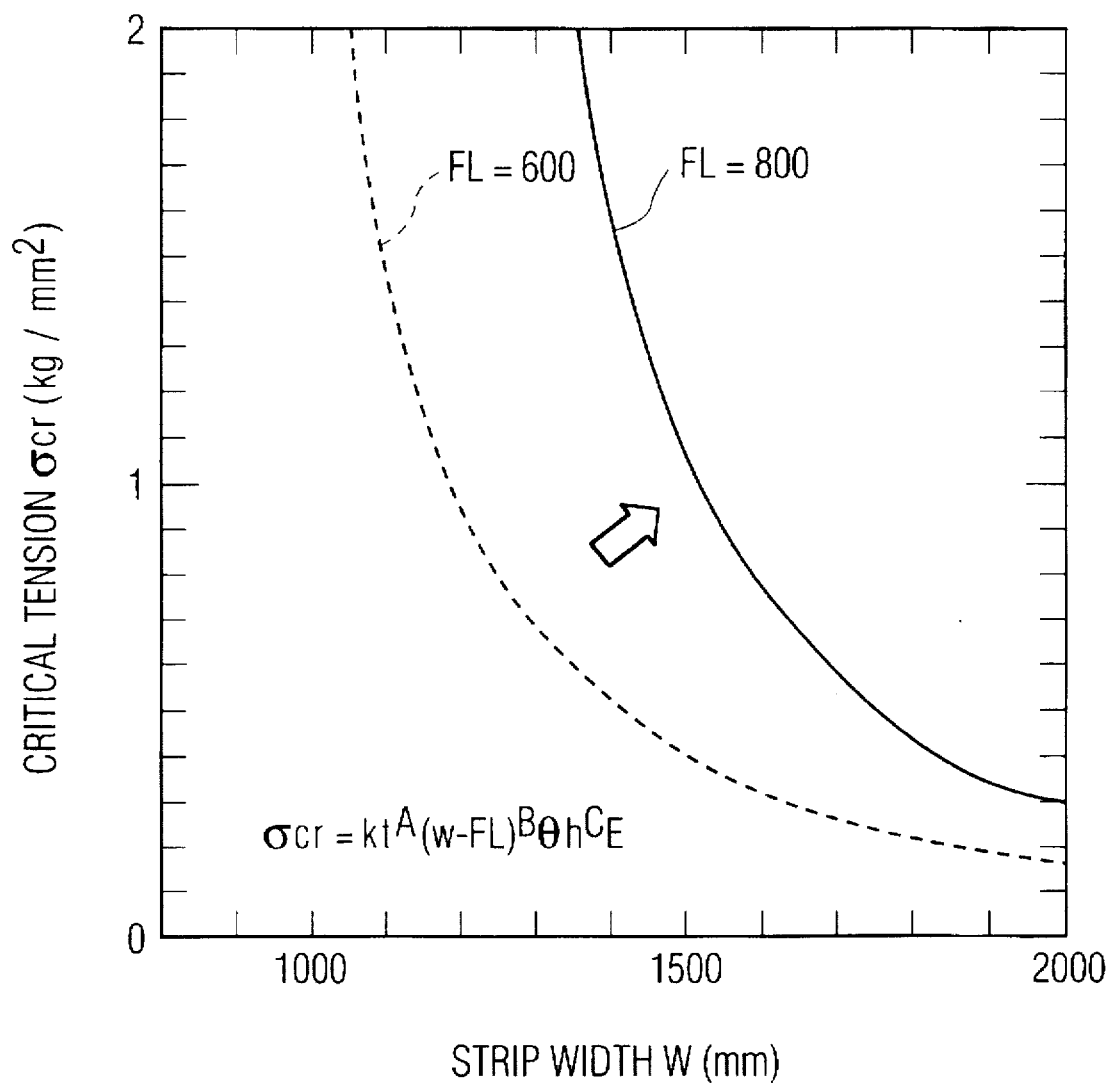
FIG. 1 is a graph showing a relation between a metal strip width and a critical tension to generate heat buckle according to the present invention.

The tension working on the metal strip was determined by an experiment using a commercial vertical continuous annealing furnace. The treated metal strip (steel strip) was 1540 to 1820 mm wide, a flat portion of the tapered roll 600 to 800 mm long, and the mechanical crown 0.3 to 0.8 mm long. Strain gauges were attached to the chocks on the top tapered rolls where the heat buckles are more easily generated within the continuous annealing furnace to determine the load applied to the rolls. The tension applied to the metal strip was determined by dividing a observed value by a cross sectional area of the metal strip. FIG. 1 shows the relation of the width of the metal strip and the critical tension to generate the heat buckle derived from equation (1). The results were computed by using the values of K, A, B, and C obtained from the regression analysis of the experimental result under a condition that the ratio of a strip width to a strip thickness (W/t) was kept unchanged. In FIG. 1, the ratio of the strip width to the strip thickness (W/t) was 2500. As seen in FIG. 1, an optimum tension exists for each shape of roll.

For example, when the length of the flat portion of the tapered rolls increases, the critical tension to generate the heat buckle increases.

The tension ($\sigma$) which is applied to the metal strip in the furnace is necessary that the relation of the critical tension ($\sigma_{cr}$) and the tension ($\sigma_{min}$) necessary for the prevention of the traverse displacement satisfies $\sigma_{min} < \sigma < \sigma_{cr}$ from the standpoint of the heat buckle and the prevention of the transverse displacement.

Consequently, if the value of $\sigma_{cr}$ is defined by equation (1) and if the value of $\sigma_{min}$ is determined by an experiment, the generation of the heat buckle and of the transverse displacement can be prevented through the measurement of tension $\sigma$ applied to the metal strip and through the control of the tension to be the critical tension $\sigma_{cr}$ or less to generate the heat buckle and to be the tension $\sigma_{min}$ or more necessary to prevent the transverse displacement.

The tension $\sigma_{min}$ necessary to prevent the transverse displacement can be obtained as a minimum value of the tension $\sigma$ satisfying the following equations:

$$\Delta D < (l - W)/2$$

$\Delta D = g(t, W, \mu, LS, E, \theta_h, \sigma, Ra, Ra')$ where

Δ D: transverse displacement amount
l: roll barrel length
W: width of the metal strip(mm)
t: thickness of the metal strip(mm)
μ: coefficient of friction between the metal strip and roll
LS: line speed
E: Young's modulus of the metal strip
$\theta_h$: roll taper under the hot state
σ: tension of the metal strip
Ra: surface roughness of the metal strip
Ra': surface roughness of roll.

Figure 8:
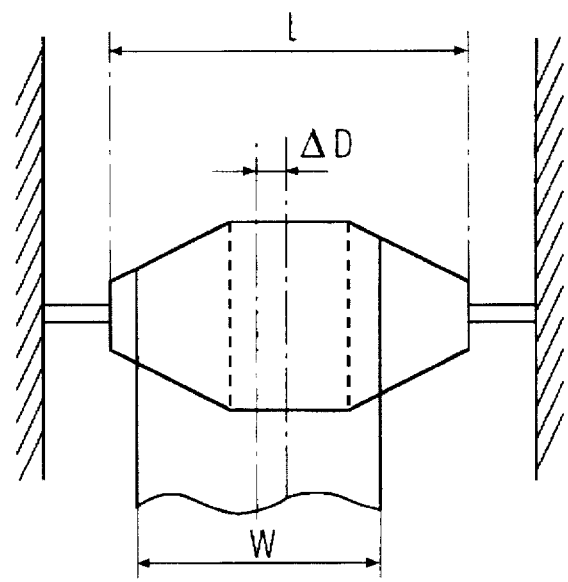
FIG. 8 is a schematic drawing showing the roll barrel length, the width of the metal strip and the amount of transverse displacement.

FIG. 8 is a schematic drawing showing the roll barrel length (B), the width of the metal strip (W) and the amount of transverse displacement (ΔD).

Now, an embodiment of the present invention will be explained with reference to the drawings of the figures.

Figure 2:
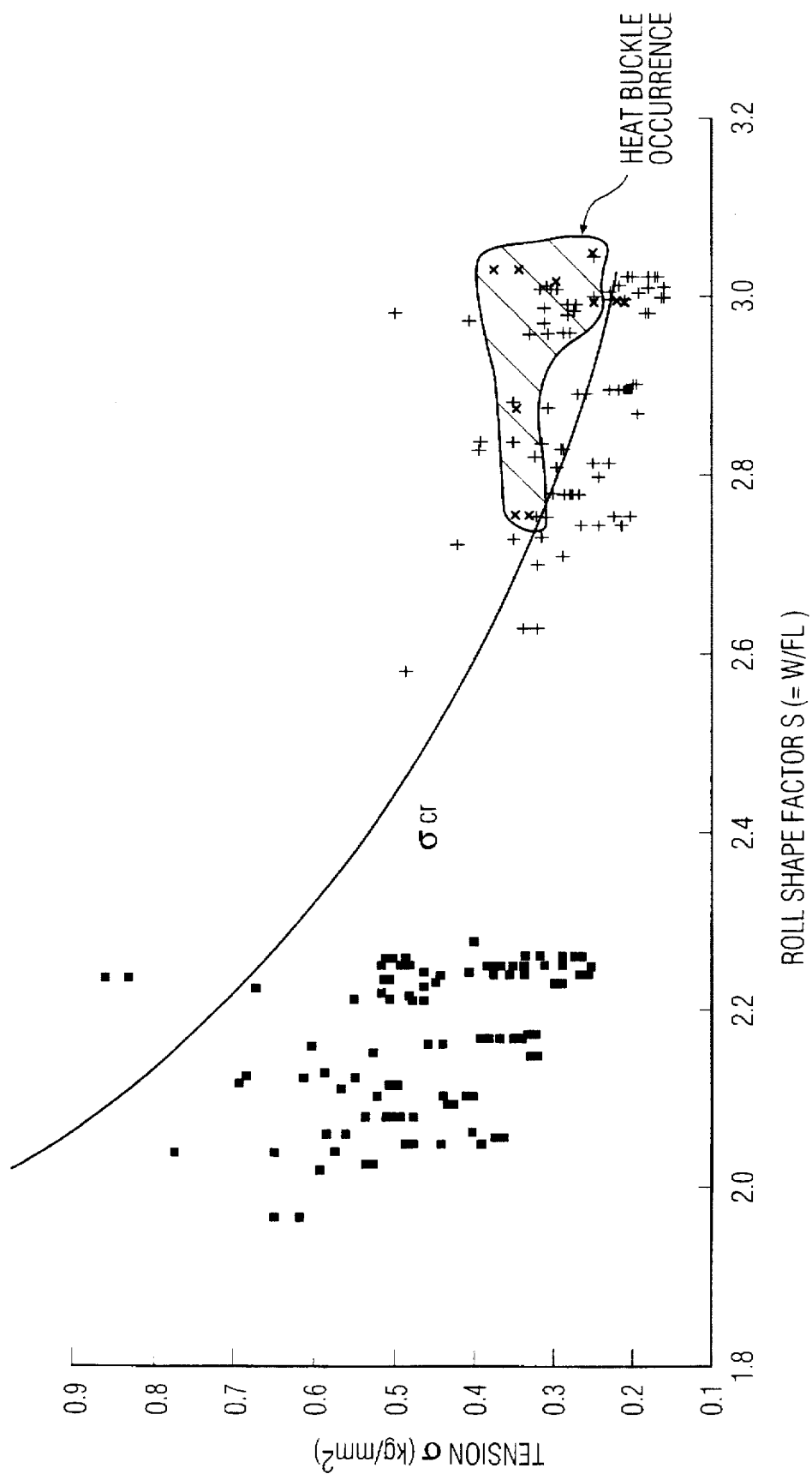
FIG. 2 a graph showing a relation between the roll shape factor and the tension working on the metal strip according to the present invention.

FIG. 2 shows a tendency of tension in relation to the roll shape factor and the tension working on the metal strip at the top tapered rolls. The roll shape factor S is defined as the ratio of the length of flat portion of the tapered roll, FL to the width, W, of metal strip. The figure compares the case where the length of the flat portion, FL at the top and bottom rolls are equal to each other and the case where the length of the flat portion of the top roll is longer than that of the bottom roll. All the data of MC value in FIG. 2 are 0.8 mm. The marks of ■ in the graph designate the observed tension of the present invention with top FL of 800 mm and bottom FL of 600 mm. The marks of + designate the observed tension which is out of the scope of the present invention with top FL of 600 mm and bottom FL of 600 mm. The marks of x designate the observed tension which is out of the scope of the present invention with top FL of 600 mm and bottom FL of 600 mm when the heat buckle occurs. The curve drawn in the figure shows a tendency of the critical tension $\sigma_{cr}$ to generate the heat buckle. The tendency is estimated from the results of generation of the heat buckle in the graph.

As shown clearly in FIG. 2, when the length of the flat roll portion FL is equal for both of the top and bottom rolls and when the FL value is shorter against the width W of the metal strip, the heat buckle generates. When, however, the flat roll portion length at the top roll is increased, the heat buckle does not appear. In addition, since the critical tension to generate the heat buckle is high when the roll shape factor S (=W/FL) is 2.4 or less, no heat buckle appears. As shown in Table 1, the shape factor S for the bottom rolls is preferably in a range of from 1.1 to 3.2. If the S value is less than 1.1, the magnitude of the transverse displacement increases, and if the S value exceeds 3.2, then the heat buckle appears.

TABLE 1

| Roll Position | Width of Strip W | Length of Flat Roll Portion FL | Roll Shape Factor S | Traverse Displacement | Heat Buckle |
| --- | --- | --- | --- | --- | --- |
| Top/Bottom | 600 | 600 | 1.0 | Bad | Good |
| Top | 660 | 600 | 1.1 | Good | Good |
| Top/ | 1650 | 600 | 2.75 | Good | Bad |
| Bottom | 1650 | 600 | 2.75 | Good | Good |
| Top/Bottom | 900 | 600 | 1.5 | Good | Good |
| Top/Bottom | 800 | 800 | 1.0 | Bad | Good |
| Top/Bottom | 900 | 800 | 1.13 | Good | Good |
| Top/ | 1880 | 600 | 3.13 | Good | Bad |
| Bottom | 1880 | 600 | 3.13 | Good | Good |
| Top/Bottom | 1880 | 800 | 2.35 | Good | Good |

Figure 3:
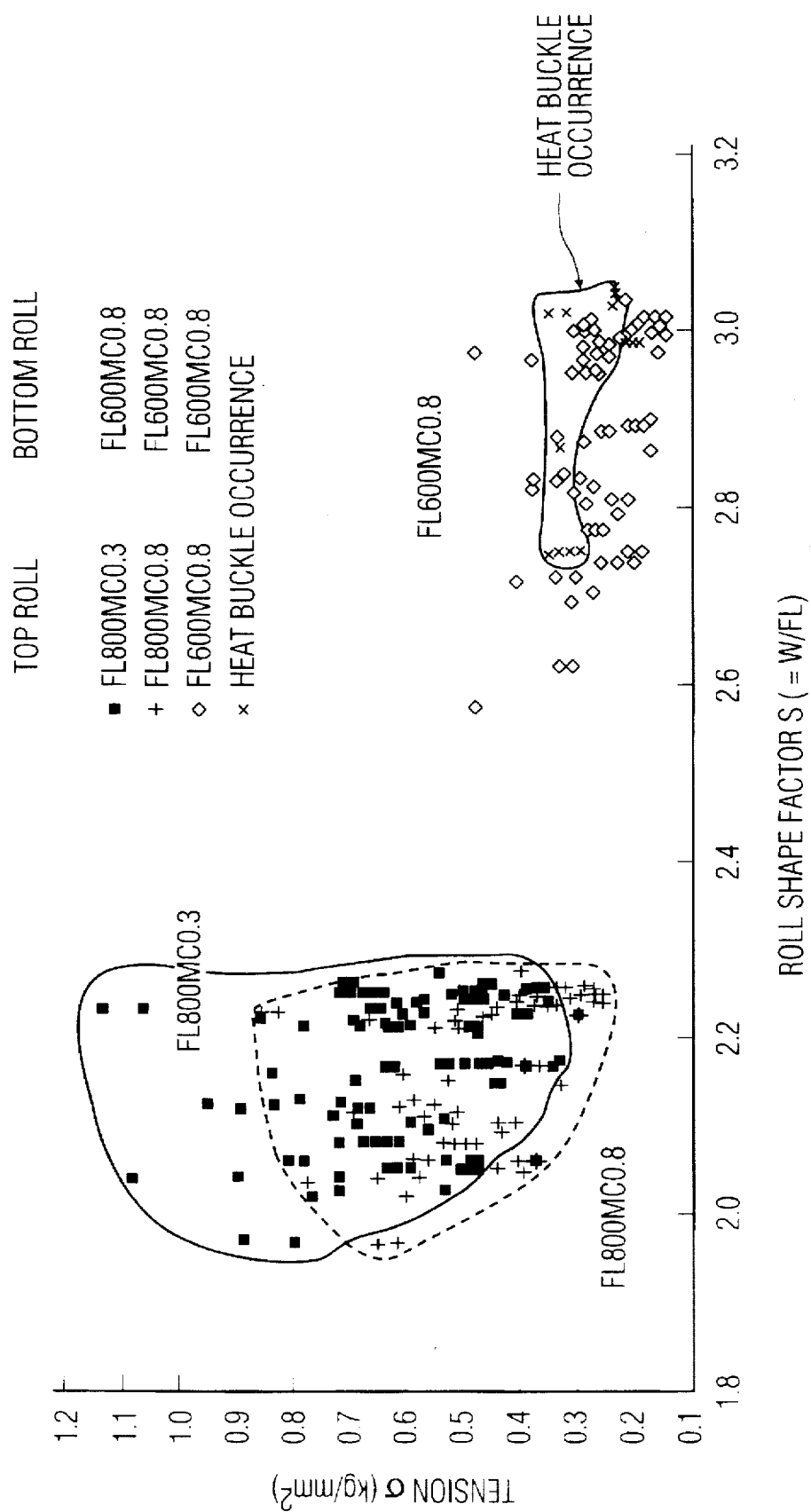
FIG. 3 is another graph showing a relation between the roll shape factor and the tension working on the metal strip according to the present invention.

FIG. 3 shows the relation between the roll shape factor and the tension applied to the metal strip at the top tapered rolls, which relation differs from that of FIG. 2. The comparison is for the rolls having different mechanical crown MCs. With regard to the results of the measurement of the tension, the marks of ■ in the graph designate the observed tension of the present invention with top roll FL of 800 mm and MC of 0.3 mm, and with bottom roll FL of 600 mm and MC of 0.8 mm. The mark of + designate the observed tension of the present invention with top roll FL of 800 mm and MC of 0.8 mm, and with bottom roll FL of 600 mm and MC of 0.8 mm. The marks of ◊ designate the observed tension at outside of the scope of the present invention with top roll FL of 600 mm and MC of 0.8 mm, and with bottom roll FL of 600 mm and MC of 0.8 mm. The metal strip thickness t is in a range of from 0.5 to 1.0 mm, and the strip width is in a range of from 1540 to 1820 mm.

As seen from FIG. 3, increase of the length of the flat portion of the tapered roll of the present invention increases the critical tension to generate the heat buckle. In addition, reduction of the mechanical crown MC prevents the generation of heat buckle even at high tension, and increases the critical tension to generate the heat buckle.

Figure 4:
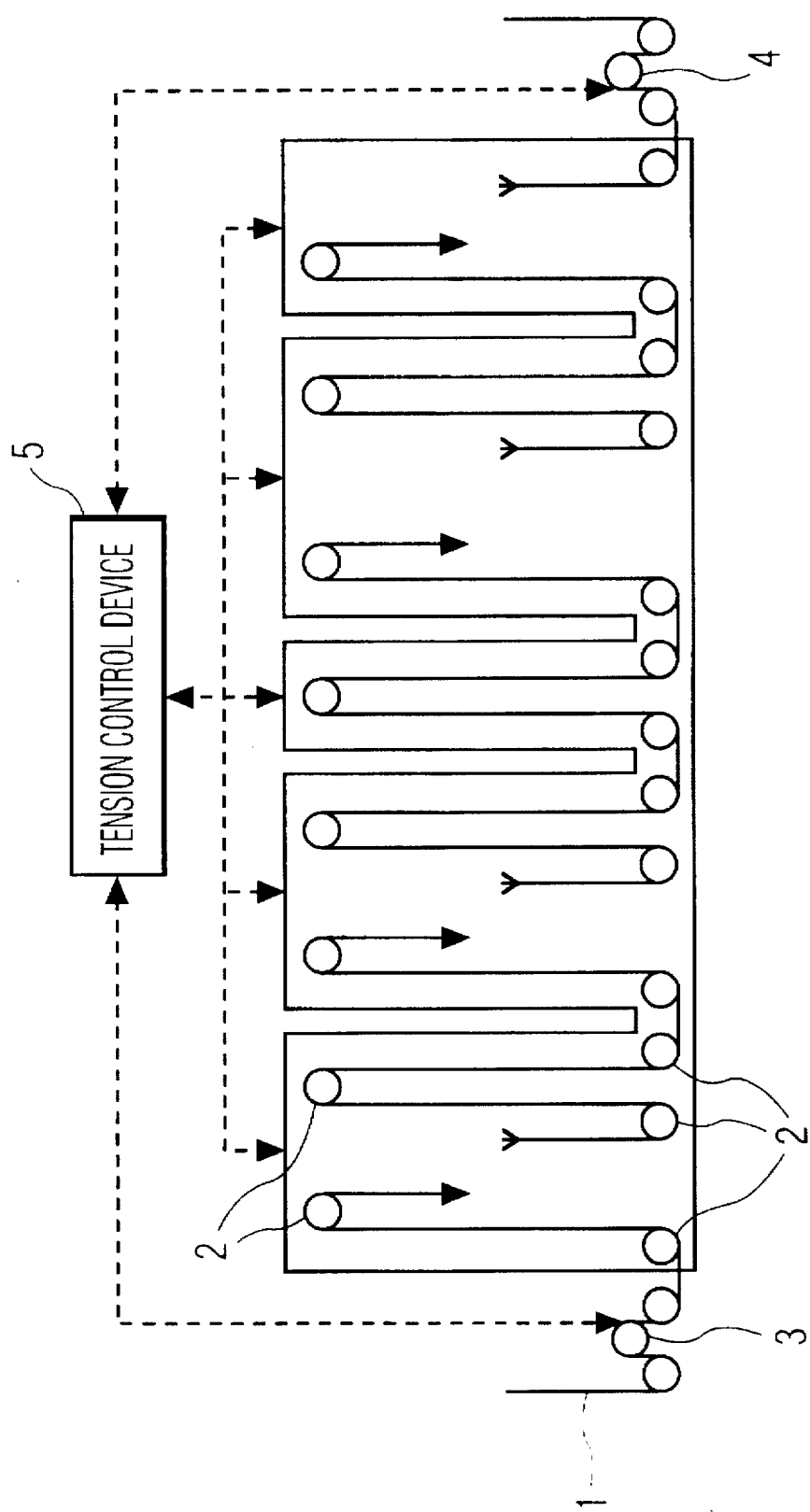
FIG. 4 is a schematic diagram of controlling tension working on the metal strip of the present invention.
Figure 7:
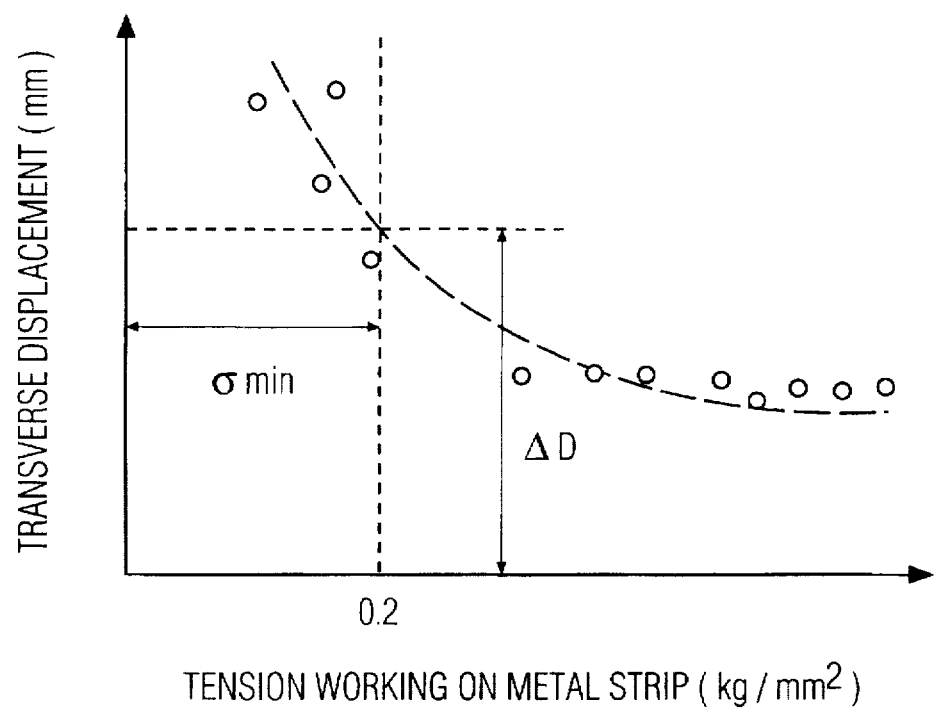
FIG. 7 is a graph showing a relation between a tension working on the metal strip and a correction amount of transverse displacement according to the present invention.

FIG. 4 is a schematic drawing for controlling the tension applied to the metal strip of the present invention. The same components with those in FIGS. 5(A) and 5(B) are given by the same referential numerals for both FIG. 4 and FIGS. 5(A) and 5(B), and no further description is given. In FIG. 4, the referential numeral 3 denotes an inlet bridle roll, and 4 is outlet bridle roll, and 5 a tension control device. The tension detection device which is attached to a part of or total of the chocks on the infurnace transfer rolls (tapered rolls) 2 sends the detected tension to the tension control device 5. The tension control device 5 controls the rotational speed of transfer rolls (tapered rolls) 2, inlet bridle rolls 3, and outlet bridle rolls 4 inside of the furnace so that the detected tension becomes the critical tension, $\sigma_{cr}$ or less and $\sigma_{min}$ or more. The critical tension, $\sigma_{cr}$ to generate the heat buckle is determined by equation (1). The $\sigma_{min}$ is a tension necessary to prevent the transverse displacement. For example, $\sigma_{min}$ of =0.2 kgf/mm$^2$ is obtained from experiment. The heat treatment furnace in this case may be a vertical furnace or a vertical furnace containing a partial horizontal furnace. FIG. 7 is a graph showing a relation between a tension working on the metal strip and a correction amount of transverse displacement according to the present invention. Based on this graphic representation, the tension, $\sigma_{min}$ is determined to control the transverse displacement to be a specific amount or less.

As described above, the present invention achieves a stable tension control in a heat treatment furnace without the conventional disadvantages such as transverse displacement and heat buckle during threading of a metal strip under circumstances of a variety of ordered grades with small lots resulting in various heat treatment temperature conditions and in strips which are wider in size.

What is claimed is:

1. A method for controlling a tension of a metal strip in a heat treatment furnace having a plurality of tapered rolls, comprising the steps of:

(a) travelling the metal strip through the plurality of tapered rolls;

(b) measuring a tension (σ) working on the metal strip through at least one of the tapered rolls;

(c) computing a critical tension ($\sigma_{cr}$) which generates heat buckle based on a thickness of the metal strip, a width of the metal strip, an elastic modulus of the metal strip, a length of a flat roll portion and a roll taper under a hot state; and (d) controlling the tension measured by the step (b) to be over a tension ($\sigma_{min}$) sufficient to prevent transverse displacement but less than the critical tension ($\sigma_{cr}$) which generates heat buckle.

wherein the critical tension ($\sigma_{cr}$) which generates heat buckle is calculated by the following equation:

$$\sigma_{cr} = K \cdot t^A \cdot (W-FL)^B \cdot \theta_h{}^C \cdot E$$

where
- t: thickness of the metal strip (mm)
- W: width of the metal strip (mm)
- FL: length of a flat roll portion
- $\theta_h$: roll taper (rad) under a hot state
- E: elastic modulus of the metal strip (kgf/mm$_2$)
- K, A, B, C: constant.

2. A method for controlling a tension of a metal strip in a heat treatment furnace having a plurality of tapered rolls, comprising the steps of:

(a) travelling the metal strip through the plurality of tapered rolls;

(b) measuring a tension ($\sigma$) working on the metal strip through at least one of the tapered rolls;

(c) computing a critical tension ($\sigma_{cr}$) which generates heat buckle based on a thickness of the metal strip, a width of the metal strip, an elastic modulus of the metal strip, a length of a flat roll portion and a roll taper under a hot state; and (d) controlling the tension measured by the step (b) to be over a tension ($\sigma_{min}$) sufficient to prevent transverse displacement but less than the critical tension ($\sigma_{cr}$) which generates heat buckle.

wherein the tension ($\sigma_{min}$) sufficient to prevent transverse displacement is obtained as a minimum value of the tension ($\sigma$) satisfying the following equations:

$$\Delta D < (l-W)/2$$

$$\Delta D = g(t, W, \mu, LS, E, \theta_h, \sigma, Ra, Ra')$$

where
- $\Delta D$: transverse displacement amount
- l: roll barrel length
- W: width of the metal strip (mm)
- t: thickness of the metal strip (mm)
- $\mu$: coefficient of friction between the metal strip and roll
- LS: line speed
- E: Young's modulus of the metal strip
- $\theta_h$: roll taper under a hot state
- $\sigma$: tension of the metal strip
- Ra: surface roughness of the metal strip
- Ra': surface roughness of roll.

3. A method for controlling a tension of a metal strip in a heat treatment furnace having a plurality of tapered rolls, comprising the steps of:

(a) travelling the metal strip through the plurality of tapered rolls;

(b) measuring a tension ($\sigma$) working on the metal strip through at least one of the tapered rolls;

(c) computing a critical tension ($\sigma_{cr}$) which generates heat buckle based on a thickness of the metal strip, a width of the metal strip, an elastic modulus of the metal strip, a length of a flat roll portion and a roll taper under a hot state; and (d) controlling the tension measured by the step (b) to be over a tension ($\sigma_{min}$) sufficient to prevent transverse displacement but less than the critical tension ($\sigma_{cr}$) which generates heat buckle.

wherein the critical tension ($\sigma_{cr}$) which generates heat buckle is calculated by the following equation:

$$\sigma_{cr} = K \cdot t^A \cdot (W-FL)^B \cdot \theta_h{}^C \cdot E$$

where
- t: thickness of the metal strip (mm)
- W: width of the metal strip (mm)
- FL: length of a flat roll portion
- $\theta_h$: roll taper (rad) under a hot state
- E: elastic modulus of the metal strip (kgf/mm$_2$)
- K, A, B, C: constant, and wherein the tension ($\sigma_{min}$) sufficient to prevent transverse displacement is obtained as a minimum value of the tension ($\sigma$) satisfying the following equations:

$$\Delta D < (l-W)/2$$

$$\Delta D = g(t, W, \mu, LS, E, \theta_h, \sigma, Ra, Ra')$$

where
- $\Delta D$: transverse displacement amount
- l: roll barrel length
- W: width of the metal strip (mm)
- t: thickness of the metal strip (mm)
- $\mu$: coefficient of friction between the metal strip and roll
- LS: line speed
- E: Young's modulus of the metal strip
- $\theta_h$: roll taper under a hot state
- $\sigma$: tension of the metal strip
- Ra: surface roughness of the metal strip
- Ra': surface roughness of roll.

* * * * *